March 3, 1959  J. R. BOXCER ET AL  2,875,607
ULTRASONIC TESTING APPARATUS
Filed July 1, 1955  3 Sheets-Sheet 2
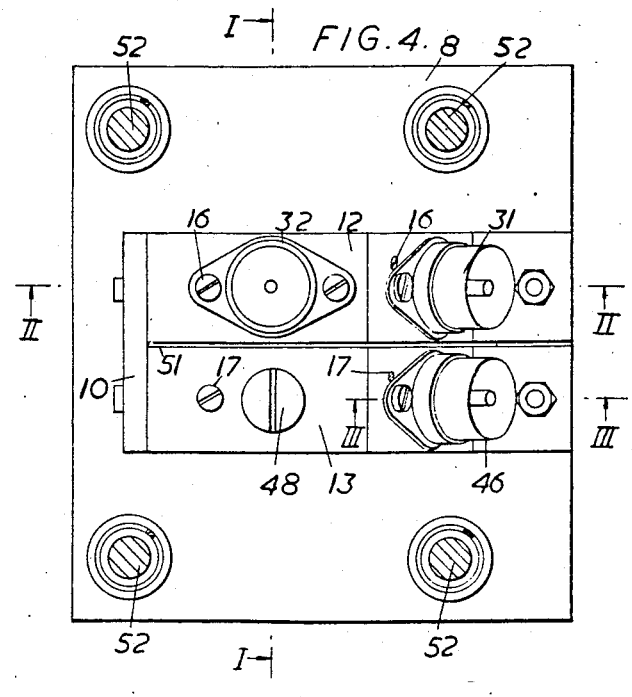
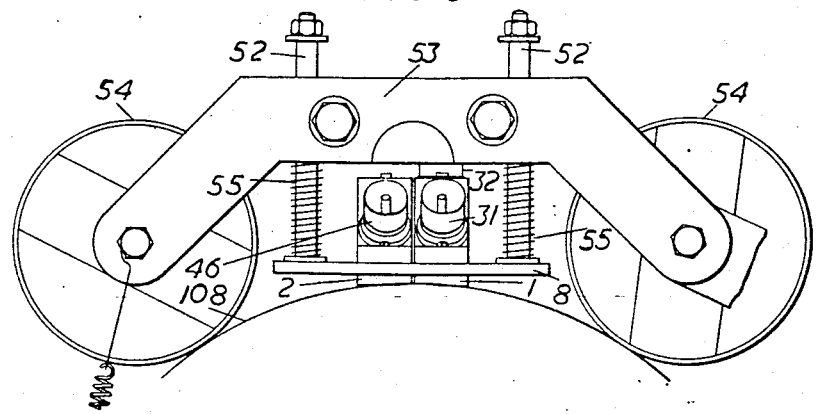
Inventor
John R. Boxcer
Hans Bincer
By
Attorney March 3, 1959 J. R. BOXCER ET AL 2,875,607
ULTRASONIC TESTING APPARATUS
Filed July 1, 1955 3 Sheets-Sheet 3
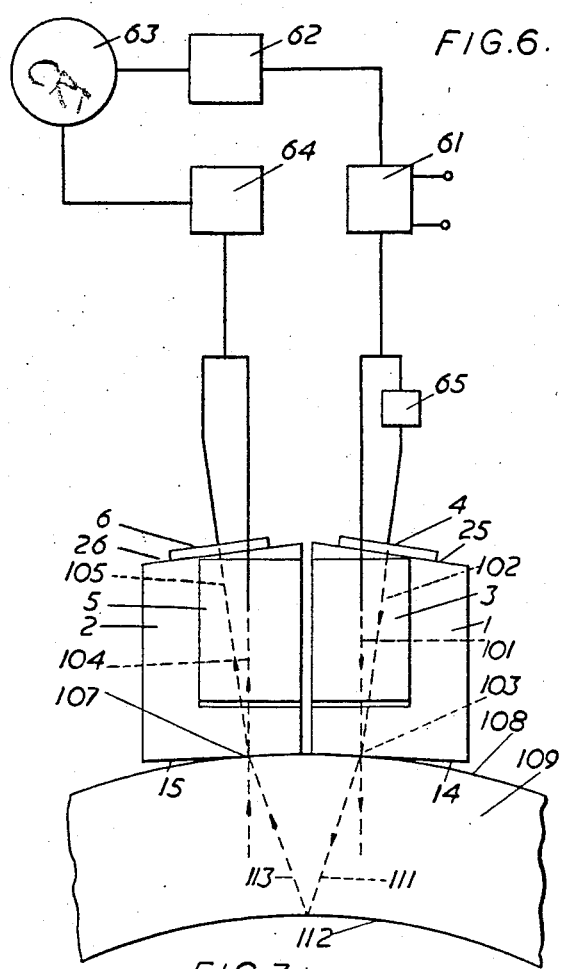
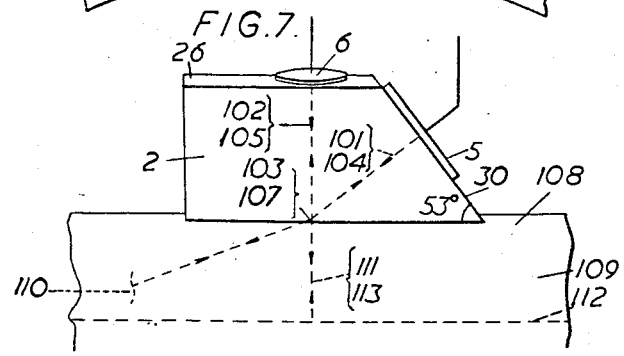
Inventor
John R. Boxcer
Hans Bincer
By J. P. Moran
Attorney

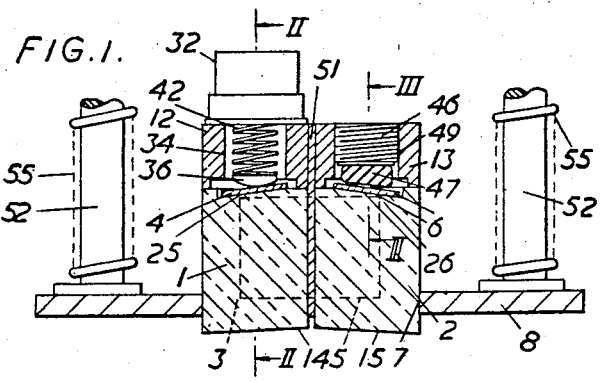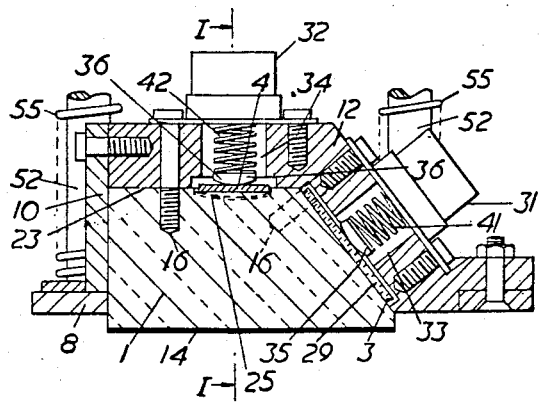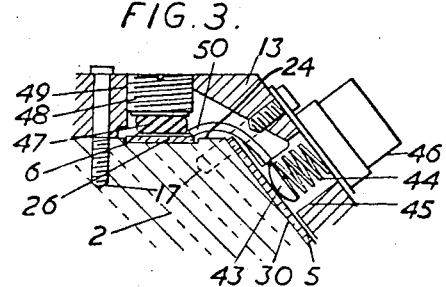

United States Patent Office 2,875,607
Patented Mar. 3, 1959

2,875,607

ULTRASONIC TESTING APPARATUS

John R. Boxcer and Hans Bincer, London, England, assignors to The Babcock & Wilcox Company, New York, N. Y., a corporation of New Jersey Application July 1, 1955, Serial No. 519,474

7 Claims. (Cl. 73—67.9)

This invention relates to ultrasonic testing apparatus.

In this method of testing, a beam, entering the object under test at an acute angle, travels through the object until it strikes a defect or fissure or other reflecting surface, whence it is reflected back. Such reflecting surface may be constituted by an end wall of the object. If the object under test is, for example, very long, or made of a very absorptive material, or presents no abrupt discontinuities, no echo will be received. Such a failure to receive an echo may, however, be caused by insufficient coupling between the probe and the object under test. In order to be able to distinguish between these two cases of failure to receive an echo it has been proposed to introduce a subsidiary beam substantially vertically into the object under test, thus giving an early echo from that boundary surface which will in most cases be found more or less parallel to the contact surface between the probe and the object.

Difficulties have been encountered in producing a unit for carrying out this method which is reliable, sensitive, compact and portable. According to the previous proposal the probe consists of a block on the surfaces of which piezo-electric crystals are mounted so as to send two beams into the object under test, one at an acute angle to the contact surface for inspecting the length of the object, and the other substantially vertically so that an echo may be received indicating the adequacy of the coupling. Since both crystals are mounted on the same block and moreover each acts as both transmitter and receiver, there will be a large amount of acoustical interference. Under such conditions the coupling-testing and the defect-testing echoes must be received by separate indicating means, such as oscilloscopes involving substantial duplication in the electrical part of the apparatus.

Moreover, since any defect echo, and the coupling-testing echo are received on separate indicating screens, the operator cannot conveniently be aware of variations in contact efficiency which will affect his estimate of, for example, the size of a fissure.

In an ultrasonic probe, for inspecting an object by means of ultrasonic impulses, provided with means for testing the adequacy of coupling at the probe-object interface by detecting reflection within the object from a surface of the object, according to the present invention the body of the probe is in two sections separated and acoustically insulated from one another and each section is provided with two electro-acoustic transducers the normal axes or lines of action of which intersect or substantially intersect at the coupling surface of the section, the transducers of one section being adapted severally to serve as inspecting pulse and coupling-testing pulse transmitting transducers and the transducers of the other section being adapted severally to serve as inspecting pulse and coupling-testing pulse receiving transducers.

The sections are preferably separated by a gap having a width of a least 1/32 inch and containing acoustically insulating material.

If the coupling-testing probe transmitting transducer is arranged to transmit pulses for reflection by a surface of the object opposite its coupling surface, preferably the normal axes or lines of action of the coupling-testing pulse-transmitting and receiving transducers are inclined towards one another whereby to afford a degree of focussing over a range of thicknesses of objects to be tested. If the probe is to be applied to the flat surface of an object and has the sections side by side with the coupling surfaces thereof flat and in the same plane, and if the normal axes or lines of action of the two coupling-testing transducers are inclined towards one another, a degree of focussing is achieved. If the probe is intended for testing a circumferential weld or the like in a cylindrical object such as a pipe, assuming the probe coupling surfaces are flat and side by side, the angle between the coupling surfaces is preferably made slightly less than 180°, the angle to be preferred depending upon the curvature of the object, in this case the normal axes or lines of action of the two coupling-testing transducers should in order to achieve focussing be inclined to one another more greatly than the normals to the coupling surfaces are inclined to one another.

The invention will now be described by way of example with reference to the accompanying drawings, in which:

Figure 1 is an end elevation, in section on the line I—I of Figures 2 and 4, of a probe for detecting faults in a pipe wall;

Figure 2 is a side elevation of the probe in section on the lines II—II of Figures 1 and 4;

Figure 3 is a side elevation of part of the probe in section on the lines III—III of Figures 1 and 4;

Figure 4 is a plan of the probe;

Figure 5 is an end view of the probe mounted in a jig (only part of which is shown) for traversing it over a pipe wall;

Figure 6 is a diagram representing the sections provided with transducers, the normal axes or lines of action thereof, the electrical scheme for obtaining visual indications, and other matters connected with the description of the operation; and Fig. 7 is a diagram in which some of the items represented in Figure 6 are seen in side view.

Referring the Figures 1 to 4 of the drawings, an ultrasonic probe for detecting faults in a pipe wall, and designed to be carried in a jig of the same construction as or of similar construction to the jig described with reference to the drawings in application Serial No. 519,477, filed July 1, 1955, by H. Bincer, comprises two body sections 1 and 2 of the material known by the registered trademark "Perspex," of which the one section 1, which will be referred to as the transmitting section, is provided with both an inspecting pulse transmitting piezo-electric crystal 3 and a coupling testing pulse transmitting piezo-electric crystal 4, and the other section 2, which will be referred to as the receiving section, is provided with both an inspecting pulse-receiving piezo-electric crystal 5 and a coupling testing pulse receiving piezo-electric crystal 6.

Perspex is a synthetic thermoplastic resin chemically described as polymethyl methacrylate.

The sections are flat-sided and of equal widths and are mounted side by side in a single aperture 7 in a rectangular plate 8 and are separated from one another by a gap of between 1/16" and 1/32". A mild steel plate 10 perpendicular to the plate 8 is welded to the plate 8 at an edge of the aperture 7 therein; the section 1 is secured by two screws 16 to and inwardly of a brass yoke 12, which at one end is secured by screw to the plate 10 and the other end is bolted to the plate 8, and the section 2 is secured by corresponding screws 17 to and inwardly of a brass yoke 13 which at one end is also secured by screw to the plate 10 and at the other end is also bolted to the plate 8. The yokes 12 and 13 are also separated from one another by a gap of between 1/16" and 1/32".

The sections 1 and 2 extend a short distance inwardly of the plate 8 and the innermost surfaces constitute coupling surfaces 14 and 15 respectively for contacting the outer surface of the pipe. The coupling surfaces 14 and 15 are flat but symmetrically inclined to the plane of the plate 8 and so that they slightly face one another so that they may symmetrically contact tangentially the outer surface of a pipe to be tested. At the outer surfaces 23 and 24, opposite the respective coupling surfaces 14 and 15, of the sections 1 and 2 there are mounted respectively the coupling testing pulse transmitting crystal 4 and the coupling testing pulse receiving crystal 6. The crystals lie against respective surfaces 25 and 26, parts of the surfaces 23 and 24, which are formed in the sections 1 and 2 so that the crystals 4 and 6 are also symmetrically inclined to the plane of the plate 8 and so that their inner faces also slightly face one another. The crystals 4 and 6 are placed so that their normal axes or lines of action intersect the respective coupling faces 14 and 15 at or near the lines of contact of the latter with the outer surface of the pipe to be tested; and they are inclined at a greater angle to one another than the coupling surfaces 14 and 15 to an extent and for reasons which will be described.

Of the sections 1 and 2 the greater parts of the respective end surfaces 29 and 30 opposite to the plate 10 are inclined at an angle of or approximately of 53° to the coupling surfaces 14 and 15. The inspecting transmitting crystal 3 and the inspecting receiving crystal 5 are mounted on these surfaces, being so positioned that (as will be more fully described with reference to Figures 6 and 7) the normal axes or lines of action of the crystals 3 and 4 intersect on the coupling surface 14 and the normal axes or lines of action of the crystals 5 and 6 intersect on the coupling surface 15. It will also be adequate in most cases for the attainment of the advantages to be described if the normal axes or lines of action of the crystals 3 and 4 intersect near the plane of the coupling surface 14 without intersecting exactly on the said surface, and similarly with the normal axes or lines of action of the crystals 5 and 6 and the coupling surface 15.

Pulses of alternating electric potential of ultrasonic frequency are led to the crystals 3 and 4 through respective co-axial cable sockets 31 and 32 which are secured by screws to the yoke 12 at apertures 33 and 34 therein, and through contacts 35 and 36 which are pressed against the crystals, thereby urging the crystals towards the surfaces 29 and 25, by compression springs 41 and 42 extending through the apertures, which springs serve also to connect the contacts electrically to the sockets.

The crystal 5 is urged towards the surface 30 by a contact 43, which is pressed towards the crystal by a compression spring 44 which extends through an aperture 45 in the yoke 13 from a co-axial cable socket 46. Pulses of alternating electric potential of ultrasonic frequency are led from the crystal to the socket 46 through the contact 43 and the spring 44. The crystal 6 is urged towards the surface 26 by a rubber pad 47 compressed by a screw 48 closing an aperture 49 in the yoke 13 above the crystal 6. Pulses of alternating electric potential of ultrasonic frequency are led from the crystal 6 via a covered lead 50, a bared end of which is retained in contact with the crystal 6 by means of the pad 47 and the other bared end of which is soldered to the contact 43.

The gap between the sections 1 and 2, except where the sections project inwardly of the plate 8, and most of the gap between the yokes 12 and 13, including the regions between the apertures 33 and 45 and between the apertures 34 and 49, are filled by a laminated layer 51 of alternating thin plastic sheets and metal foil, for example, polyvinyl-chloride sheets and aluminium foil.

Both faces of each crystal are metallized and for each crystal there may be provided in order to earth the lower face thereof a sheet of aluminium foil (not shown) which extends between the crystal and the section 1 or 2 and also contacts the yoke 12 or 13 by an edge or edges clamped between the yoke 12 or 13 and the section 1 or 2.

Adjacent the four corners of the rectangular plate 8 perpendicular pillars 52 are provided. Referring to Figure 5, these pillars are designed to fit with a certain degree of clearance within appropriate apertures in a link 53, supported by rollers 54, of a jig such as is described with reference to drawings in application Serial No. 519,477, filed July 1, 1955, by H. Bincer. The jig, only parts of which are indicated in Figure 5, is arranged to fit around the pipe to be tested, and springs 55 on the pillars 52 act to urge the plate 8 and therewith the coupling faces 14 and 15 of the probe against the outer surfaces of the pipe.

Referring to Figures 6 and 7, the normal axis or line of action 101 of the crystal 3 and the normal axis or line of action 102 of the crystal 4 intersect at a point 103 on the coupling surface 14 of the transmitting section 1, and the normal axis or line of action 104 of the crystal 5, and the normal axis or line of action 105 of the crystal 6 intersect at a point 107 on the coupling surface 15 of the receiving section 2. As shown, the points 103 and 107 are on the lines of contact of the coupling surfaces 14 and 15 with the outer surface 108 of a pipe wall 109, but the probe is also adapted for use with pipes of a range of larger diameters and with pipes of a range of smaller diameters. The crystals 3 and 4 are excited by a synchroniser and pulse generator 61 which controls the sweep circuit 62 for a cathode ray tube 63 arranged to receive through an amplifier 64 the outputs of the crystals 5 and 6. In order to prevent confusion between echoes from pulses transmitted by the crystal 3 and echoes from pulses transmitted by the crystal 4 in cases where these echoes would otherwise be received at substantially the same time, an electronic delay circuit 65 is inserted to the crystal 4 whereby the excitation of the crystal 4 is delayed, the said circuit 65 being triggered by the pulses delivered to the crystal 3. The circuit 65 is suitably of the type with which the magnitude of the delay and the amplitude of the output pulses therefrom are each adjustable.

In operation, the probe mounted in the jig is urged against the outer surface 108 of the pipe to be tested, the coupling surfaces 14 and 15 of the sections 1 and 2 being coupled to the pipe surface by a suitable film of couplant oil, and the circuits are energised.

The electric pulses of ultrasonic frequency generated by the synchroniser and pulse generator 61 result in an indication on the face of the cathode ray tube 63 at a point in the sweep of the cathode spot. While the pulse from generator 61 provides, on oscilloscope 63, only a horizontal trace synchronized with the transmitted pulse, with there being no connection between generator 61 and the vertical plates of the oscilloscope, the transmitted pulse is, however, displayed on the oscilloscope 63 due to electromagnetic effects accompanying transmission of the pulse and picked up by the receiver amplifier 64. This is due to the close arrangement of the pulse transmitting and receiving circuits in the detector. Coaxial cables are not perfect electric screens, and a certain amount of pick-up between the transmitting and receiving cable occurs. In practice, the two cables are more or less close to one another and situated in parallel. Thus, there is never any difficulty about receiving a picked-up signal of the transmitted pulse on the oscilloscope 63. On the contrary, the transmitted pulse can be troublesome, if it is too strong, because of paralyzing the amplifier which may prevent display of an echo reflected from a defect near to the surface. The pulses are also converted by the crystal 3 into pulses of acoustic waves of ultrasonic frequency which travel through the transmitting section 1, into the pipe wall 109 at and in the neighbourhood of the point 103 and travel along the pipe wall until they may strike a defect or fissure or other reflective surface 110 whence they are reflected back. Those of the reflected waves which impinge from inside the metal upon the outer surface 108 of the pipe at and in the neighbourhood of the point 107 enter the receiving section 2 and travel therein to the crystal 5, where pulses of alternating electric potential of ultrasonic frequency are generated in correspondence with the received acoustic waves. The electric pulses generated by the crystal 5 result in an indication on the face of the cathode ray tube 63 at another point in the sweep of the cathode spot. The distance between the indications at the two points in the sweep of the cathode spot is a measure of the distance of the defect, within the pipe wall, from the probe. While the transmitter and receiver crystals are in the same plane or parallel to each other, this does not prevent receipt of reflected energy by receiver 5 as there is a scatter effect in the material so that at least some of the reflected energy will be diverted to receiver 5 particularly when a flaw or defect is encountered.

The pulses of alternating electric potential of ultrasonic frequency which are generated by the synchroniser and pulse generator 61 are led also to the crystal 4 to which they are applied after delay effected by the electric delay circuit 65; the corresponding acoustic waves of ultrasonic frequency travel through the transmitting section 1, leave the section 1 at and in the neighbourhood of the point 103 to enter the metal of the pipe wall, and many or most travel therein as shown at 111 to the inner surface 112 of the pipe, whence they are reflected back. The receiving section 2 receives at and in the neighbourhood of the point 107 waves reflected as shown at 113 from the pipe inner surface 112, whence they are transmitted through the receiving section 2 to the crystal 6, which generates corresponding pulses of alternating electric potential of ultrasonic frequency which are also led through the amplifier 64 and cause an indication upon the face of the cathode ray tube at a third point in the sweep of the cathode spot.

Since the symmetrically inclined crystals 4 and 6 face one another to a greater extent than do the symmetrically inclined coupling surfaces 14 and 15, the normal axis or line of action 102 of the crystal 4 intersects at the point 103 on the coupling surface the normal to the coupling surface, which normal is also here the normal to the pipe surface 108, at such an angle that the waves in the metal leaving that point tend to have a direction not only towards the opposite, inner pipe surface 112 but also a component of direction towards the other section 2, while the normal axis or line of action 105 of the crystal 6 is conversely inclined so that the crystal 6 is aptly positioned to receive waves in the pipe metal approaching the point 107 in a direction both inward and away from the section 1. By virtue of the described inclinations of the normal axes or lines of action 102 and 105 of the crystals 4 and 6 a degree of focussing is achieved, whereby the first bottom echo which alone need be used for indicating the adequacy of the coupling between the probe and the pipe wall tends to be bigger than successive bottom echoes from the inner surface of the pipe. In practice, pipes of an appreciable range of thicknesses may be tested with satisfactory advantages with a probe of a fixed degree of focussing.

Provided there is adequate coupling between the probe and the pipe surface, the echo received by the crystal 6 produces an indication at a point on the sweep of the cathode spot displaced from that of the indication due to the pulses from the synchroniser and pulse generator 61. The observer, therefore, is assured of the adequacy of the coupling notwithstanding that there may be no indication of a fault in the pipe. In the event of a fault in the pipe reflecting pulses to the crystal 5, a further indication occurs on the sweep of the cathode spot, the indication occurring, or if necessary being made to occur by adjustment of the electronic delay circuit 65, at a point between that of the indication due to the synchroniser and pulse generator 61 and that due to the reflection from the pipe inner surface 112 received by the crystal 6.

In the arrangement described, ultrasonic pick-up across the probe between the crystal 3 or the crystal 4 and the crystal 5 or the crystal 6 is negligible. Indications due to direct reflection from the probe-pipe interface, which when testing thin-walled pipes with a probe comprising a single block for both transmitting and receiving would tend to be confused with the desired indications due to reflection from the inner pipe surface, are avoided and pick-up by surface waves in the probe-pipe interface is negligible at the usual operating sensitivities. The electrical apparatus comprising a single synchroniser and pulse generator, a single sweep circuit and a single oscilloscope is relatively simple. In the arrangement described, moreover, both the inspecting pulse and the coupling-testing pulse can be viewed simultaneously on the same screen so that variations in coupling efficiency, for example as the probe is moved from place to place on the pipe, are immediately noted by the observer. By observing the relative heights of the indications of the echoes from a defect and from the inner pipe surface a more exact estimation of the defect can be made by the operator.

There is the further advantage that the crystals 4 and 6 may be used for the measurement of pipe thickness, the time taken for the echo to return from the inner pipe surface being effectively measured in any one of the well known ways. The focussing described produces a first echo with a sharper leading edge over a range of thicknesses which enables a greater accuracy of measurement to be achieved.

In a modification there may be provided, as time delay means to retard the signals due to echoes from the pipe inner surface, instead of the electronic delay circuit 65, an ultrasonic delay line, the amplitude of the output pulses from which varies with the amplitude of the input pulses thereto, disposed between the crystal 6 and the amplifier 64; in this case the electrical outputs from the crystals 5 and 6 must be taken off through separate co-axial sockets.

What we claim is:

1. Ultrasonic testing apparatus comprising, in combination, a pair of flat-sided relatively elongated matching body sections arranged in substantially parallel, juxtaposed and slightly spaced acoustically insulated relation, and each having an inner coupling surface arranged to be coupled to one surface of the work, an outer surface opposite the coupling surface, and an end surface inclined longitudinally of the section at an acute angle to the coupling surface; one of said sections constituting a transmitter of ultrasonic energy and the other constituting a receiver of reflected ultrasonic energy; electro-acoustic transducers engaged respectively with each of said outer and end surfaces; the transducers on the outer surfaces acting respectively as a transmitter and a receiver of coupling testing pulses; the outer surfaces of the two sections being at an angle to each other whereby the pulses transmitted by one outer surface transducer are reflected from the opposite surface of the work for reception by the other outer surface transducer; the transducers on the end surfaces acting respectively as a transmitter and a receiver of defect detecting pulses; the normal axes of sound transmission of the transducer on the inclined end surface of each section intersecting the corresponding axis of the transducer on the outer surface of the section in the coupling surface thereof; an electric pulse generator connected to the transducers of the transmitting section; an oscilloscope connected to said pulse generator through a sweep circuit; and circuit means connecting said oscilloscope to the transducers of the receiving section.

2. Ultrasonic testing apparatus comprising, in combination, a pair of flat-sided relatively elongated matching body sections arranged in substantially parallel, juxtaposed and slightly spaced acoustically insulated relation, and each having an inner coupling surface arranged to be coupled to one surface of the work, an outer surface opposite the coupling surface, and an end surface inclined longitudinally of the section at an acute angle to the coupling surface; one of said sections constituting a transmitter of ultrasonic energy and the other constituting a receiver of reflected ultrasonic energy; electro-acoustic transducers engaged respectively with each of said outer and end surfaces; the transducers on the outer surfaces acting respectively as a transmitter and a receiver of coupling testing pulses; the outer surfaces of the two sections extending at an angle of slightly less than 180° to each other; whereby the pulses transmitted by one outer surface transducer are reflected from the opposite surface of the work for reception by the other outer surface transducer; the transducers on the end surfaces acting respectively as a transmitter and a receiver of defect detecting pulses; the normal axes of sound transmission of the transducer on the inclined end surface of each section intersecting the corresponding axis of the transducer on the outer surface of the section in the coupling surface thereof; an electric pulse generator connected to the transducers of the transmitting section; an oscilloscope connected to said pulse generator through a sweep circuit; and circuit means connecting said oscilloscope to the transducers of the receiving section.

3. Apparatus as claimed in claim 1 in which said sections comprise blocks of synthetic resin; and metal frame means mounting said sections.

4. Apparatus as claimed in claim 1 including time delay means interposed between said pulse generator and the transducer on the outer surface of the transmitter section.

5. Apparatus as claimed in claim 4 in which said time delay means is an electronic time delay circuit.

6. Apparatus as claimed in claim 4 in which said time delay means is an ultrasonic delay line.

7. Apparatus as claimed in claim 1 in which said transducers are piezo-electric crystals; and means resiliently biasing said crystals against the associated surfaces.

References Cited in the file of this patent

UNITED STATES PATENTS

| 2,667,780 | Van Valkenburg | Feb. 2, 1954 |

FOREIGN PATENTS

| 638,592 | Great Britain | Dec. 3, 1952 |
| 719,641 | Great Britain | Dec. 8, 1954 |